US011125681B2

(12) United States Patent
Harlow et al.

(10) Patent No.: US 11,125,681 B2
(45) Date of Patent: Sep. 21, 2021

(54) AGRICULTURAL SPECTROGRAPHIC COMPOSITION SENSOR AND METHODS FOR SAME

(71) Applicant: Raven Industries, Inc., Sioux Falls, SD (US)

(72) Inventors: Harry Harlow, Sioux Falls, SD (US); Jared Ernest Kocer, Sioux Falls, SD (US); Nicholas O. Michael, Sioux Falls, SD (US)

(73) Assignee: Raven Industries, Inc., Sioux Falls, SD (US)

( * ) Notice: Subject to any disclaimer, the term of this patent is extended or adjusted under 35 U.S.C. 154(b) by 0 days.

(21) Appl. No.: 16/752,596

(22) Filed: Jan. 24, 2020

(65) Prior Publication Data

US 2020/0240904 A1 Jul. 30, 2020

Related U.S. Application Data

(60) Provisional application No. 62/796,185, filed on Jan. 24, 2019.

(51) Int. Cl.
*G01N 21/25* (2006.01)
*G01N 21/53* (2006.01)
(Continued)

(52) U.S. Cl.
CPC ......... *G01N 21/255* (2013.01); *B05B 12/004* (2013.01); *G01N 21/33* (2013.01);
(Continued)

(58) Field of Classification Search
CPC .................................................. G01N 21/255
(Continued)

(56) References Cited

U.S. PATENT DOCUMENTS 4,121,767 A 10/1978 Jensen
4,986,782 A 1/1991 Severtson
(Continued)

FOREIGN PATENT DOCUMENTS

CN 106574895 A 4/2017
CN 106644973 A 5/2017
(Continued)

OTHER PUBLICATIONS

Amador-Hernandez, Judith, et al., "Simultaneous Spectrophotometric Determination of Atrazine and Dicamba in Water by Partial Least Squares Regression", J. Chil. Chem. Soc., 50, N2, (2005), 8 pgs.
(Continued)

*Primary Examiner* — Tarifur R Chowdhury
*Assistant Examiner* — Omar H Nixon
(74) *Attorney, Agent, or Firm* — Schwegman Lundberg & Woessner, P.A.

(57) ABSTRACT

An agricultural composition sensor includes a sensor housing including a flow passage configured to conduct an agricultural product. A sensor assembly is coupled with the sensor housing. The sensor assembly is configured to detect one or more injection products in the agricultural product. The sensor assembly includes an emanator configured to generate at least one light beam and a sensing element configured to receive the at least one light beam. A directing element is configured to deliver the light beam through the flow of the agricultural product. The sensing element is configured to generate a spectral plot from the light beam delivered through the flow of the agricultural product having one or more spectral signatures corresponding to the one or more injection products.

19 Claims, 11 Drawing Sheets

(51) Int. Cl.
  *B05B 12/00* (2018.01)
  *G01N 21/33* (2006.01)
  *A01M 7/00* (2006.01)
  *A01C 23/04* (2006.01)

(52) U.S. Cl.
  CPC ............ *G01N 21/53* (2013.01); *A01C 23/047* (2013.01); *A01M 7/0042* (2013.01)

(58) Field of Classification Search
  USPC ........................................................ 356/342
  See application file for complete search history.

(56) References Cited

U.S. PATENT DOCUMENTS

| | | |
|---|---|---|
| 5,046,665 A | 9/1991 | Kor et al. |
| 5,125,749 A | 6/1992 | Leugers et al. |
| 5,421,906 A | 6/1995 | Borah |
| 5,461,229 A | 10/1995 | Sauter et al. |
| 5,462,660 A | 10/1995 | Singleton et al. |
| 5,493,115 A | 2/1996 | Deinzer et al. |
| 5,512,202 A | 4/1996 | Borah |
| 5,576,217 A | 11/1996 | Hsu |
| 5,639,375 A | 6/1997 | Hiroshi |
| 5,656,422 A | 8/1997 | Crawford et al. |
| 5,666,987 A | 9/1997 | Combs |
| 5,851,777 A | 12/1998 | Hunter et al. |
| 5,900,944 A | 5/1999 | Mawby |
| 5,927,603 A | 7/1999 | McNabb |
| 6,346,888 B1 | 2/2002 | Conrad et al. |
| 6,463,941 B1 | 10/2002 | Takita |
| 6,465,776 B1 | 10/2002 | Moini et al. |
| 8,109,448 B2 | 2/2012 | Giles |
| 8,981,314 B2 | 3/2015 | Klinkhammer et al. |
| 9,058,969 B2 | 6/2015 | Schroeder |
| 9,170,154 B2 | 10/2015 | Myrick et al. |
| 9,316,629 B2 | 4/2016 | Nuhu et al. |
| 9,417,206 B2 | 8/2016 | Wang et al. |
| 9,435,687 B1* | 9/2016 | Schwartz ................... G01J 3/42 |
| 9,657,258 B2 | 5/2017 | Herr et al. |
| 9,820,431 B2 | 11/2017 | Conrad et al. |
| 9,983,122 B1 | 5/2018 | Van Dommelen et al. |
| 10,139,386 B2 | 11/2018 | Smeeton et al. |
| 2002/0135771 A1* | 9/2002 | Witty ................... G01N 33/558 356/445 |
| 2006/0237665 A1* | 10/2006 | Barney .............. G01N 21/6408 250/458.1 |
| 2007/0138401 A1 | 6/2007 | Tokhtuev et al. |
| 2008/0033296 A1* | 2/2008 | Isern ...................... C12N 13/00 600/439 |
| 2009/0011945 A1 | 1/2009 | Bright et al. |
| 2011/0269648 A1 | 11/2011 | Schwartz |
| 2012/0002189 A1* | 1/2012 | Bengoechea Apezteguia ............ G01S 17/58 356/28.5 |
| 2012/0168532 A1 | 7/2012 | Giles |
| 2012/0200855 A1 | 8/2012 | Bonyuet et al. |
| 2014/0190245 A1 | 7/2014 | Rafferty et al. |
| 2014/0361094 A1 | 12/2014 | Michael |
| 2015/0276589 A1* | 10/2015 | Wagner .............. G01N 15/0205 356/440 |
| 2017/0080444 A1 | 3/2017 | Posselius et al. |
| 2017/0082541 A1 | 3/2017 | Possellus et al. |
| 2017/0112043 A1 | 4/2017 | Nair et al. |
| 2018/0002644 A1 | 1/2018 | Herr et al. |
| 2018/0023599 A1* | 1/2018 | Hussein ................... F15D 1/06 137/1 |
| 2018/0095040 A1* | 4/2018 | Sumpf ................... G01N 21/53 |
| 2018/0178236 A1 | 6/2018 | Posselius et al. |
| 2019/0009285 A1 | 1/2019 | Zimmerman et al. |

FOREIGN PATENT DOCUMENTS

| | | |
|---|---|---|
| DE | 102016109472 A1 | 11/2017 |
| EP | 1023831 B1 | 10/2003 |
| EP | 2617286 A1 | 7/2013 |
| WO | WO-02090908 A1 | 11/2002 |
| WO | WO-2014201008 A1 | 12/2014 |
| WO | WO-2018129323 A1 | 7/2018 |

OTHER PUBLICATIONS

Hloben, P., et al., "On-line Methods for Determining Mixture Concentration in Direct Injection Systems for Site-Specific Herbicide Application", VDI Berichte Journal, 1798, (2003), 373-378.

Huang, Yanbo, et al., "In-situ plant hyperspectral sensing for early detection of soybean injury from dicamba", Biosystems Engineering, 149, (2016), 51-59.

Koo, Y. M., et al., "Flow Characteristics of injected Concentrates in Spray Booms", Presented at the 1987 Winter Meeting, American Society of Agricultural Engineers, (1987), 15 pgs.

* cited by examiner

AGRICULTURAL SPECTROGRAPHIC COMPOSITION SENSOR AND METHODS FOR SAME

PRIORITY APPLICATIONS

This application claims the benefit of priority to U.S. Provisional Patent Application Ser. No. 62/796,185, filed Jan. 24, 2019, the content of which is incorporated herein by reference in its entirety.

CROSS-REFERENCE TO RELATED PATENT DOCUMENTS

This patent application is also related to U.S. patent application Ser. No. 14/300,761, entitled LOCALIZED PRODUCT INJECTION SYSTEM FOR AN AGRICULTURAL SPRAYER, and filed Jun. 10, 2014.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright Raven Industries, Inc., of Sioux Falls, S. Dak. All Rights Reserved.

TECHNICAL FIELD

This document pertains generally, but not by way of limitation, to composition sensing and monitoring in agricultural products.

BACKGROUND

Agricultural sprayers are used to distribute agricultural products, such as fertilizers, insecticides, herbicides and fungicides to crops. Agricultural sprayers include one or more distribution booms that are long enough (e.g., 60 feet to 150 feet) to spray multiple rows of crops in a single pass. Agricultural fields are often irregular in shape and contain one or more of contour changes, tree lines, hillsides, ponds or streams. Irregular field shapes and contour changes provide challenges in even distribution of agricultural products and can lead to waste of agricultural products. Additionally, the configuration of the agricultural sprayer itself may cause unpredictable variation in application of agricultural products.

Agricultural sprayers include a reservoir for a carrier substance. The reservoir is in communication, by way of a header tube or pipe, with a plurality of sections provided along one or more carrier booms (e.g., boom tubes). The header is the main line extending between the reservoir and the carrier booms. Each of the plurality of sections includes multiple sprayer nozzles that distribute the carrier substance received by the section. The carrier substance is used as a vehicle to carry and distribute one or more injection products dispersed into the carrier substance, for instance herbicides, pesticides, fertilizers or the like. Optionally, injection products used with a first crop are not used with a second crop. The agricultural sprayer is accordingly cleaned (e.g., with water, cleaning products or the like) with a flush of the sprayer plumbing to ready the sprayer for application to subsequent different crops.

In one example, the injection product is retained in a reservoir separate from the reservoir for the carrier substance. The injection product is pumped from the reservoir and delivered from the reservoir to the header of the carrier substance, in some examples, an inline mixer (e.g., a static mixer) mixes the injected chemical with the carrier substance upstream from or within the header. The header then delivers the mixture to the boom tubes, and the mixture is distributed to the sections and finally the nozzles associated with each of the sections.

BRIEF DESCRIPTION OF THE DRAWINGS

In the drawings, which are not necessarily drawn to scale, like numerals can describe similar components in different views. Like numerals having different letter suffixes can represent different instances of similar components. The drawings illustrate generally, by way of example, but not by way of limitation, various embodiments discussed in the present document.

SUMMARY

Figure 1:
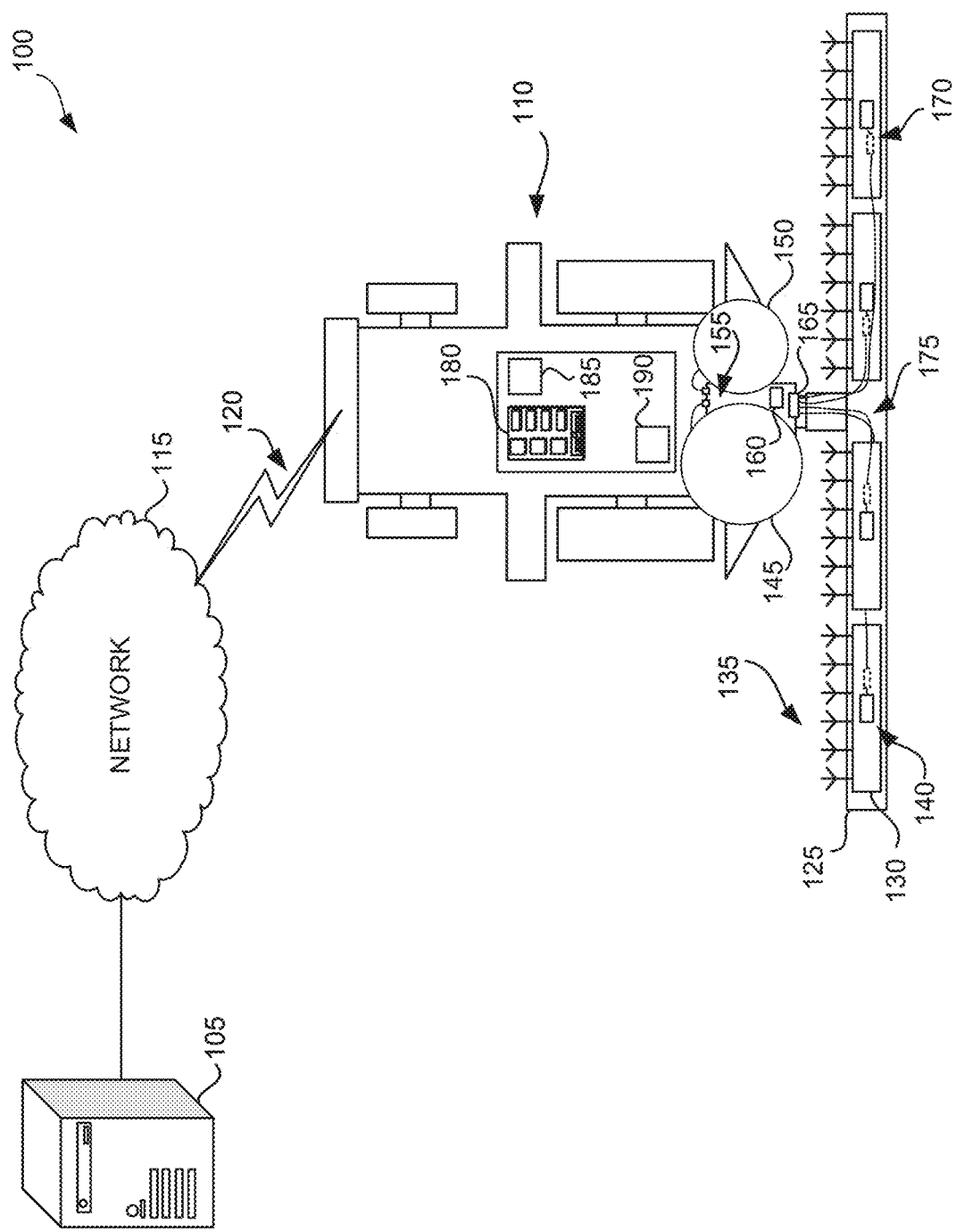
FIG. 1 illustrates an example of a system that integrates an agricultural spectrographic composition sensor.

The present inventors have recognized, among other things, that a problem to be solved includes accurately detecting and measuring injection products (e.g., additives) in carrier fluids, and minimizing deviations in concentration of one or more injection products in a carrier flow. In an example, the present subject matter provides a solution to this problem, such as by providing a localized product injection system having one or more composition sensors configured to measure the composition of the agricultural product including the detection of injection products (e.g., additives) and concentration of the injection products in a carrier fluid. In another example, the localized product injection system communicates with the carrier substance distribution system locally, for instance at the plurality of product dispensers such as one or more of the sprayer sections or the individual sprayer nozzles of the sprayer sections.

In one example, the localized product injection system includes a plurality of localized injection interfaces that maintain a pressurized source of the injection product immediately adjacent to each of the product dispensers and accordingly ready for instantaneous injection to the flow of the carrier substance immediately prior to dispensing through product dispensers. For instance, each of the plurality of localized injection interfaces includes an interface valve and an injection port. Because the interface valve is positioned at the corresponding product dispenser, upon operation of the interface valve the injection product is instantaneously provided through the injection port to the dispenser (e.g., one or more of a sprayer section or sprayer nozzle). With the localized product injection system, the injection products are, in an example, readily mixed with the carrier fluid to a specified concentration for instance according to one or more of a prescription for the crop, location in the field, or based on analysis of forthcoming crops as the sprayer moves through the field.

In some examples, mixing of the injection product with the carrier fluid is incomplete or localized. For instance, injection is performed upstream from dispensers, such as the sprayer section or sprayer nozzles. Stagnation zones, laminar flow or the like (upstream or at the dispensers) may frustrate the mixing of the injection product. Accordingly, the actual concentration of the injection product relative to the specified concentration may vary. In examples described herein the systems include one or more composition sensors configured to detect the composition of one or more agricultural products in the system, and refine control (e.g., supplemental or throttled injection) to achieve the specified concentration. Optionally, the one or more compositions sensors communicate with a controller to provide feedback-based control of injection of the one or more injection products to achieve actual concentrations of each product corresponding to the specified concentrations for each.

Other example composition sensors are subject to interference in detection from other compounds including, but not limited to, residues of various products, cleaning solutions or the like that may frustrate accurate and precise detection and measurement of products. For example, previously used injection products for corn, wheat or the like are difficult to clean from sprayer systems. The products adhere to components of the sprayer systems and are not readily removed. In some examples, these products are harmful to other crops (e.g., cotton, soybeans or the like) that are treated with the same sprayer using different agricultural products specific to those (other) crops. In other examples, specified injection products for a crop scheduled for treatment interact with previously used injection products and are partially masked from detection by sensors. The accurate and precise detection of injection products, including discrimination between products for identification and determination of concentration of the products, is hampered because of these interactions, and the actual concentration may vary from the specified concentration because products are not accurately detected. In other examples in some cases the inclusion of non-specified remnant products, if undetected, may decrease yields or harm treated crops.

The composition sensors described herein are configured to detect one or more agricultural products in a carrier fluid (including discrimination between compounds and identification, as well as determine concentration). In one example, the compositions sensors include turbulating features configured agitate (e.g., mix, initiate turbulent flow or the like) the agricultural product including the carrier fluid and one or more injection products. Electromagnetic energy (e.g., light, ultraviolet light or the like) is directed through the turbulated agricultural product and a spectral plot is generated at a detector of the sensor, such as a complementary metal-oxide-semiconductor (CMOS) detector. The turbulated fluid enhances the detection of one or more agricultural products in spectral plot, for instance by providing a higher resolution plot. The higher resolution plot is compared with a catalog of agricultural products, each including a prescription having multiple wavelengths or other unique characteristics. Because of the higher resolution plot, multiple compounds are detected including, but not limited to, identification and determination of concentration. Accordingly, accurate and precise detection is conducted even in an environment that potentially frustrates detection of products (e.g., because of interactions between products, masking of products, multiple products, residue of previous products or the like).

In other examples, the composition sensors described herein include multiple varied electromagnetic energy elements. For instance, a sensor includes a light generating element, such as an infrared element, and an ultraviolet light element. The ultraviolet light 'drives' the agricultural product, for instance by exciting or creating resonance with the molecules of the agricultural compounds or the like. The driven compounds intensify the spectral plot by one or more orders of magnitude and accordingly facilitate higher resolution detection of agricultural compounds (e.g., identification and determination of concentration). Optionally, scattered light (e.g., right angle light scattering away from the generated UV and IR light) is collected and used to generate the intensified spectral plot.

This overview is intended to provide an overview of subject matter of the present patent application. It is not intended to provide an exclusive or exhaustive explanation of the invention. The detailed description is included to provide further information about the present patent application.

DETAILED DESCRIPTION

The present disclosure includes systems and methods for label free detection of injection products (e.g., additives) in an agricultural product (e.g., products in a carrier fluid, such as water). Agricultural products further include carry over herbicide compounds in agricultural tanks and sprayers including residue, remnants or the like. The systems and methods described herein detect agricultural products in the supply tank, system plumbing, dispensers (sprayer section, sprayer nozzles or the like) to ensure specified concentrations of the products are applied and to prevent the application of harmful agricultural products to crops. In other examples, the sensors described herein are used with a controller to log the composition of the agricultural product sprayed at discrete locations in the field. For instance, the identity and actual concentrations of the agricultural products are logged and indexed to the zones of a field where applied. In one example, the logged information is collected and sent to a Raven Slingshot system or the like to notify the operator or monitor regarding the composition of the agricultural product applied, or provide an alarm or indication based on improper agricultural product application, deviations in concentration or the like.

Sprayer carry over of hormone class herbicides can have negative effects on sensitive plants like soybeans, cotton, and other crops. This sensitivity occurs at levels at or below 15 PPM resulting in significant yield loss for growers. It is difficult to remove these herbicides from equipment due to dead areas (e.g., stagnation zones or the like) in sprayer tanks and piping systems and permeation of these compounds into hoses and other sprayer components. The concentration sensors described herein detect (e.g., identify and determine concentration) of these products, such as herbicides, at levels below the threshold (e.g., a harm threshold) for yield loss and significant plant stress. The composition sensors described herein are optionally solid-state sensors placed in the flow stream of the agricultural product, and in some examples are positioned immediately upstream relative to a dispenser, such as sprayer nozzles, sprayer section or the like. In an example, the composition sensors have a minimal profile relative to the system plumbing and include minimal (e.g., none or incidental) features that promote stagnation. Instead, the composition sensors including in line features of the dispensing tubes include one or more tubulating features such as, fins, elbows, knurling, posts or the like configured to initiate turbulent flow and enhance a spectral plot of returned electromagnetic energy. The enhanced spectral plot facilitates the detection (identification and determination of concentration) of injections products in the agricultural product even with masking, low concentrations of residual products or the like.

FIG. 1 illustrates an example of a system 100 that integrates an agricultural spectrographic composition sensor. In an example, the system 100 includes a server 105, a machine 110, and a data communication network 115. The machine 110 can be configured to communicate with the server 105 using wired or wireless elements of the data communication network 115.

The server 105 can include any computing system or computing resources, such as in a cloud computing or hosted computing environment. In an example, the server 105 is configured to interface, such as though the data communication network 115, with the one or more machines, such as the machine 110. The server 105 can, for example, monitor the operation of the machines during the application of an agricultural product to a field. Such monitoring can include receiving data that is indicative of field coverage. Such monitoring can also include receiving data that is indicative of the concentration of one or more agricultural products in a mixture of agricultural products applied by the machines. In an example, the server 105 receives the data that is indicative of the mixture of products in real time and provide feedback to the agricultural machine to, for example, cause the machine to adjust the mixture of agricultural products or the concentration of one or more agricultural products to achieve a target or specified prescription for the field or a crop in the field. In another example, the server 105 receives the data at a delayed time, such during an upload session after the machines have processed a field. In this situation, the server 105 can use the data to generate a future coverage plan, or to adjust a prescription of another application of the mixture of agricultural products. In other examples, the server 105 can use the received data to analyze or predict the yield, safety, health, or any other useful metric associated with a field, or crops planted in a field, that is processed by the machines.

The machine 110 can include any machine, such as an agricultural machine, that is provided to perform a task that includes applying a product, such as a mixture of agricultural products, to a field or other land region. In an example, the machine 110 is an agricultural sprayer that is configured to distribute agricultural products to crops. In some examples, the machine 110 includes a machine controller 180, a transceiver 185, a sensor 190. In certain examples, the machine 110 includes an implement 125. The machine controller 180 can include one or more hardware circuits or software applications that are configured to control the operation of the machine 110, such as by capturing and processing sensor data generated by one or more sensors associated with the machine, controlling the operation implement 125, or communicating with the server 105. The machine controller 180 can also be configured with circuits or software applications to instructions, data, and other information from the server 105 for controlling application of the mixed product. In an example, the machine controller 180 executes these instructions by actuating one or more electrical or mechanical circuits to adjust the application of the mixed product. In an example, the adjusting includes changing the concentration of one or more products, such as the carrier substance or a specified injection product, that are injected into the mixed product. In another example, the adjusting includes controlling the rate of application of the mixed product.

The transceiver 185 can include any wired or wireless network communication device, such a radio transceiver or an optical or line of sight communication device, that is configured to exchange digital information between the machine 110 and the server 105.

The sensors 190 can include any senor devices that are configured to capture or provide machine or coverage status information for the machine 110. In an example, the sensors 190 include imaging sensors, such as cameras and range finding or distance measuring devices, that can detect environment characteristics related to objects or obstructions. In another example, the sensors 190 include positioning device, such as global positing devices, for determining the location of the machine 110. In other examples, the sensors 190 include devices for monitoring the mixture application of products to a field. In an example, the sensors 190 are affixed to the machine 110. In another example, the sensors 190 are affixed to the implement 160.

The implement 125 can include any machine actuatable or controllable implement, such as a boom or a sprayer, for applying a product to field. In an example, the implement 125 includes one or more actuation device, sensor, or circuit 175 that is directly controllable by the machine controller 145. In other examples, the implement 125 includes a control circuit, such as an implement controller or microcontroller unit, that provides a control interface between the machine controller 180 and the one or more product dispensers, such as sprayer sections 130, nozzles 135, sensors 170, or actuator circuits 140. In some examples, the control circuit enables independent control of one or more sprayer sections 130. In some examples, the actuator circuits 140 include controllable valves that are configured to regulate the flow or mixture of one or more agricultural products dispensed by the sprayer section or by a nozzle associated with the sprayer section. The controllable values can be controlled by the control circuit or by the machine controller 180 to locally regulate the flow, mixture, or concentration of products dispensed by the sprayer sections 130. The products are provided at the sprayer sections 130 by one or more fluid circuits 175 (e.g., header hose, pipe, or tube). The fluid circuits 175 can be coupled to one or more sensors 170, such as an agricultural spectrographic composition sensor (hereinafter, "composition sensor"), to identify data that is indicative of the composition of products and such data to the control circuit or the machine controller 180.

In some examples, the machine 110 or the implement 125 includes one or more reservoirs that store agricultural products. Such reservoirs, for example, include a carrier reservoir 145 that is configured to store a carrier substance, such as water. The reservoirs can also include an injection reservoir 150 that is configured to store an injection product. In an example the carrier reservoir 145 and the injection product reservoir are coupled to a mixing module 165 that is configured inject the injection product into the carrier substance and distribute the resulting product to the one or more product dispensers. In an example, the mixing module include is located upstream from the boom 125 or the spray sections 130 and includes a sensor 160, such as a composition sensor, for measuring the composition of the mixed product, or one or more chemical characteristics of the injection product or of the mixed product. In another example, the mixture module includes components of the boom, such as the sensors 170 or the actuator circuits 140.

Figure 2:
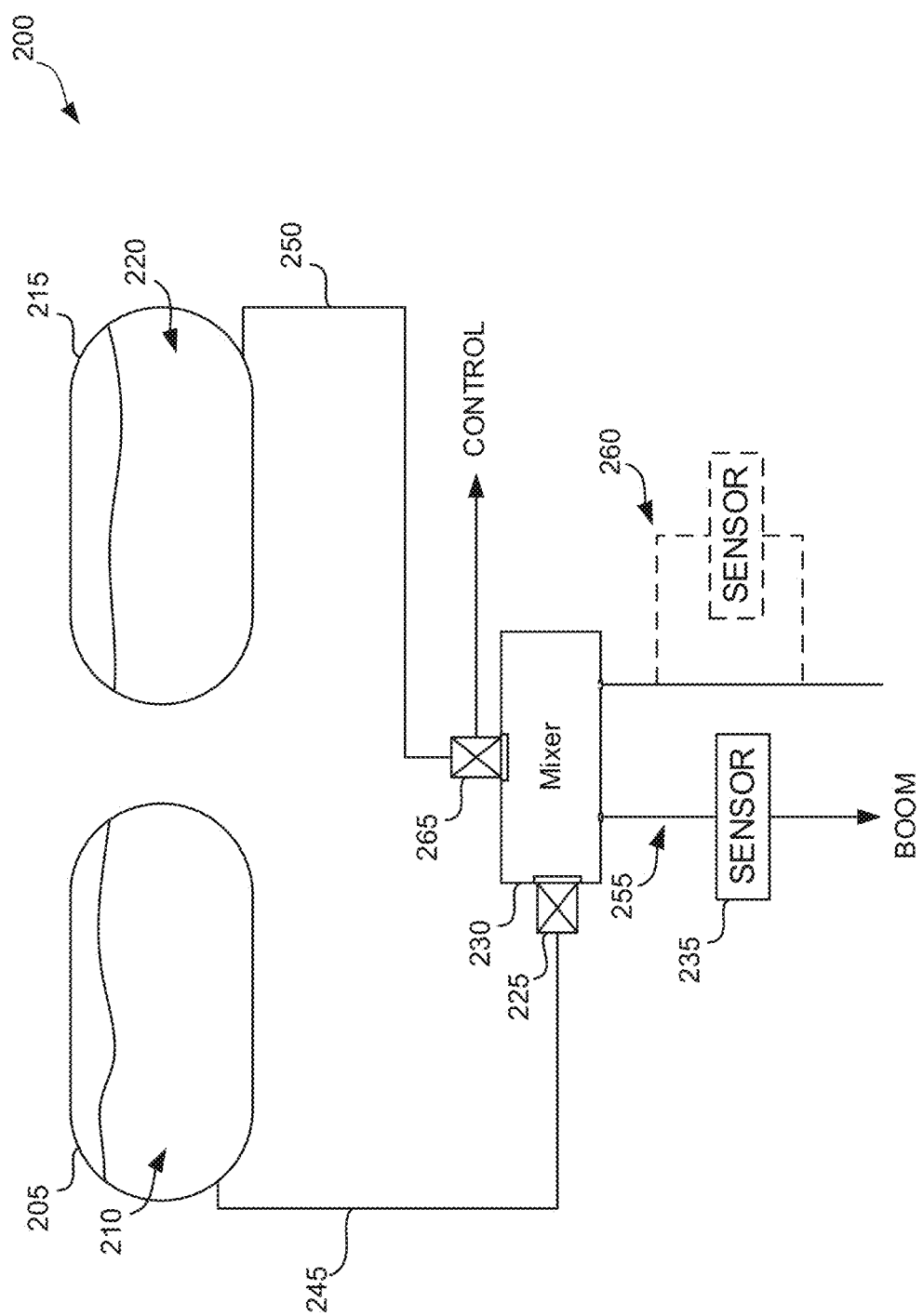
FIG. 2 illustrates an example of a product distribution system that uses an agricultural spectrographic composition sensor.

FIG. 2 illustrates an example of a product distribution system 200 that uses a composition sensor. In an example, the product distribution system 200 is an agricultural sprayer system, such as the combination of the reservoirs, mixture modules, valves, sensors, and dispensers described in the discussion of FIG. 1. The product distribution system 200, for example, include a carrier reservoir 205 having carrier substance 210, an injection reservoir 215 having injection product 220. The product distribution system 200 also includes a mixer 230 having one or more mechanical components, such as pumps, agitators, or the like for injecting the injection product 220 into the carrier substance 220, The product distribution system 200 further includes one or more pipes 245 and 250 (e.g., tubes, hoses, or the like) for conducting the carrier substance 210 and the injection product 220, respectively, to the mixer 230. The product distribution system 200 further includes one or more valves or injection ports 225 and 265 for controllably regulating the flow of the carrier substance or the injection product, respectively, into the mixer 230. In an example, the one or more valves or injection ports 225 and 265 are controllable by the machine controller 180, such as to control the concentration of the injection product in a mixed product produced by the mixer 230. The mixed product in provided, such as to the boom 125, using a header pipe 225 or one or more other pipes, such as the pipes 175.

In an example, the product distribution system 200 includes a composition sensor 235. The composition sensor 235 is an example of the sensors 160 and 170.

In some examples, the composition sensor 235 is disposed at least partially include with the header pipe 255 so as to cause a mixed product generated by the mixer 230 to flow through a flow passage (e.g., a fluid channel) of the composition sensor. In other examples, the composition. sensor 235 is disposed in a diversion piping path 260 that is configured to receive a diverted portion of the mixed product.

Figure 3:
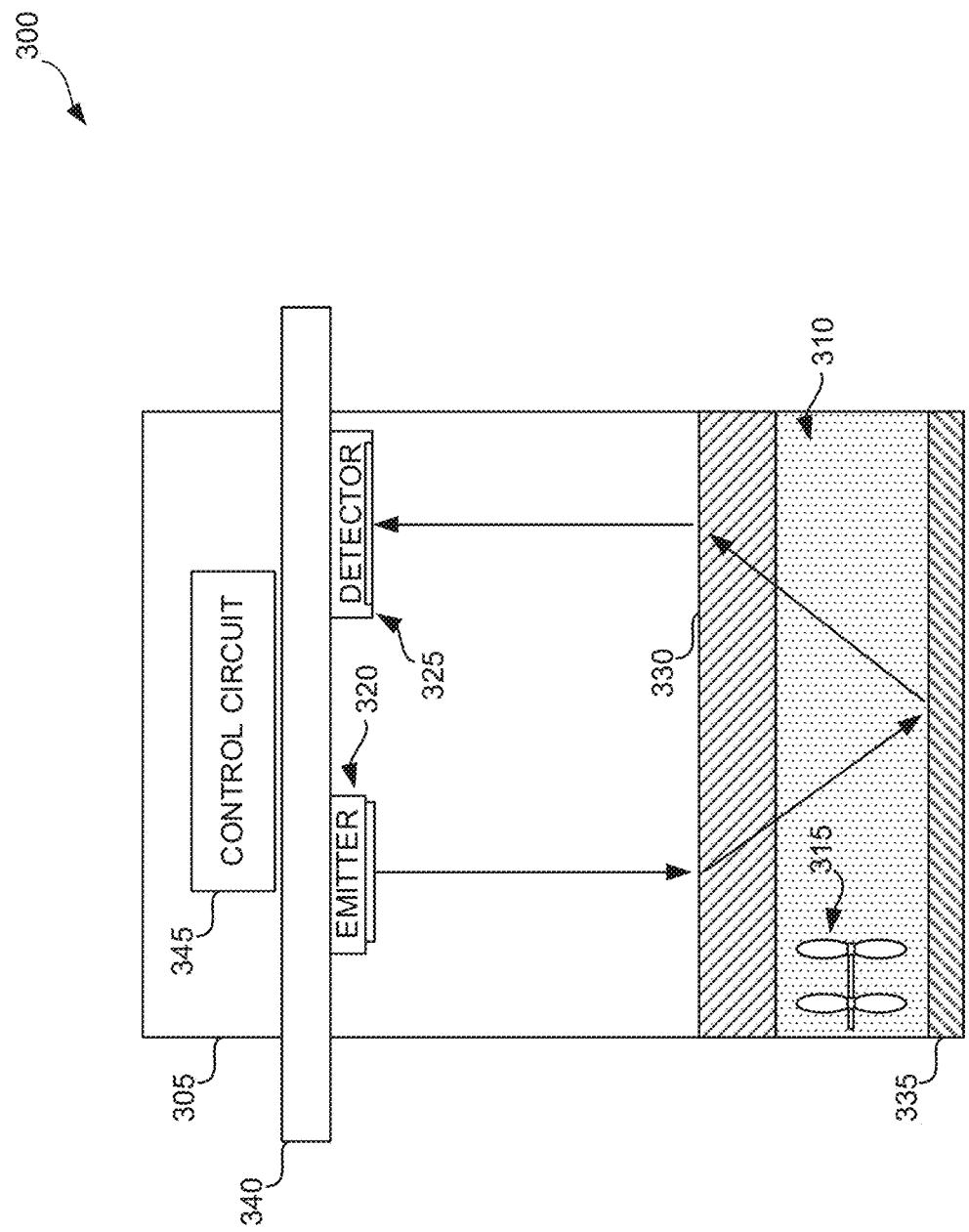
FIG. 3 illustrates an example of an agricultural spectrographic composition sensor that includes a turbulating element.

FIG. 3 illustrates an example of a composition sensor 300 that includes a turbulating element. The composition sensor 300 is an example the sensors 160, 170, or 235. The composition sensor 300 includes sensor housing 305, flow passage 310, a turbulator element 315, emanator element 320, detector element 325, directing elements 330 and 335, and control circuits 345. In some examples, the composition sensor 305 also includes a mounting flange 340. The composition sensor 305 can be constructed or fabricated using any suitable techniques or materials. The following discussions provides, by way of example and not to imply any exclusion or limitation, some of suitable techniques of materials for construing the composition sensor 300.

The sensor housing 305 can be fabricated using a metal, an engineering polymer, or any suitable material for preserving the structural integrity of the composition senor. In an example, the sensor housing 305 has a rigidity, durability, and material composition to support the physical mounting or attachment of one or more components of the composition sensor 300 to a surface of the sensor.

The flow passage 310 includes two or more openings in the composition sensor 300, such as though the housing 305, that is configured to enable the passage of fluid, such as a mixed product, though the composition sensor. In an example, at least a portion of the flow passage is constructed from a material that is transparent to electromagnetic waves, such as visible light or UV light. Such material can include quartz, glass, or the like.

The turbulator element 315 includes one or more posts fins, elbows, or knurling structures that are disposed in the flow passage 310. Such structures may be suitably rigid and may be disposed at selected locations in the flow passage, to initiate turbulent flow in a mixed product that is conducted through the passage.

The emanator element 320 includes one or more device that are configured to transmit (e.g., radiate) electromagnetic energy. In an example the emanator element 320 is a short wavelength emanator, such as a UV light emitting diode (LED). In an example the UV LED has a transmission. spectrum in the range of 200 to 400 nanometers (nm). In another example the UV LED has a transmission spectrum is below 280 nm or 260 nm. IN an example the emanator element 320 includes an array of UV LEDs. In another example, the emanator element 320 electromagnetic emanator provides a range of wavelengths that are sampled in parallel with the sensing element.

The emanator element 320 can also include a laser, such as a solid-sate LED laser having an emission spectrum in the visible or near infrared spectrum. The laser (e.g., the spectrum and output energy) can be selected to cause the laser to excite the mixture product that is conducted though the flow passage 310. In an example, the laser is selected to have power and emission spectrum characteristics suitable for implement Raman Spectroscopy techniques.

The detector element 325 (e.g., a sensing element), includes a light detecting circuit or device, such as a complementary metal oxide semiconductor (CMOS) detector (e.g., a multi-channel CMOS chip). In an example, the detector element 325 is configured to detect light emitted in electromagnetic spectrum rate of light emitted by the emanator element 320. In another example, the detector element 325 is configured to detect light emitted in the electromagnetic spectrum range of light emitted by material excited by mixture material excited by a laser emanator element 320.

The directing elements 330 (e.g., grating element) and 335 includes one or more optical materials that are configured to deliver a light beam (e.g., an electromagnetic wave) though the flow passage 310 and into, or through, a mixed product conducted by the passage. In an example, the directing element 330 and 335 includes a prism, mirror, or a fiber optic cable constructed from quartz, sapphire, glass, or the like. In an example, the directing elements 330 and 335 are selected and configured (e.g., disposed in the composition sensor 300) to cause a light beam transmitted by the emanator element 320 to pass thought the flow passage at a specified angle. In another example, the direction elements 330 and 335 are configured to cause light beam returning from the flow passage 310 to impact over a specified area of the detector element 325.

The control circuit 345 includes one or more electronic circuits that are configured to drive or actuate the emanator element 320 or to receive electronic signals from the detector element 325. In an example, the control circuit 345 receives a signal from the machine controller 180 or to trigger the emanator element 320 to transmit light at a specified frequency, amplitude, or according to a specified pattern. In another example, the control circuit 345 includes one or more signal processing circuits, such as an analog-to-digital converts (ADC), that are configured to received a signal from the detector element 325, convert an analog signal received from the detector element to a digital signal, and forward the digital signal to another, such as the server 105 or the machine controller 110 for further processing.

In an example operation, the flow passage 310 conducts an agricultural product (e.g. a mixed product) through the composition sensor 300 to facilitate exposure to the electromagnetic energy, such as UV light emitted by emanator element 320. Material in the flow passage (e.g., additives such as agricultural products, residues, impurities or the like) selectively absorb the UV light and the missing light is quantified at the detector element 325. The UV light of interest optionally falls in the 200 to 400 nm rang of the electromagnetic spectrum, such as indicated by wavelength of the emanator element 320. In an example, the emanator element 320 provides a range of wavelengths that are sampled in parallel with the detector element 325. Optionally, direction element 330 or 335 (e.g., a grating element) spreads reflected light, such as lithe reflected from direction element 335, light onto the detector element 325. The detector element 325 is in communication with a signal processing circuit of the control circuit 345, such as a multichannel multiplexer and an ADC having a resolution of at least 16-bits. The output of the ADC is provided to, and processed by, a controller, such as a microprocessor, field computer with a corresponding software module or the like. The result of the processing is provided as a spectral plot and is analyzed with a database of known analytes to detect (e.g., identify and determine concentration) the component products in the agricultural product including, but not limited to, injection products, residue of previous products and other impurities. The results of the analysis (e.g., the spectral plot, detected products or the like) are optionally communicated to other components of the control system using a CAN or DTC (J1939-ISO11783) communication system for user display and decision systems.

Figure 4:
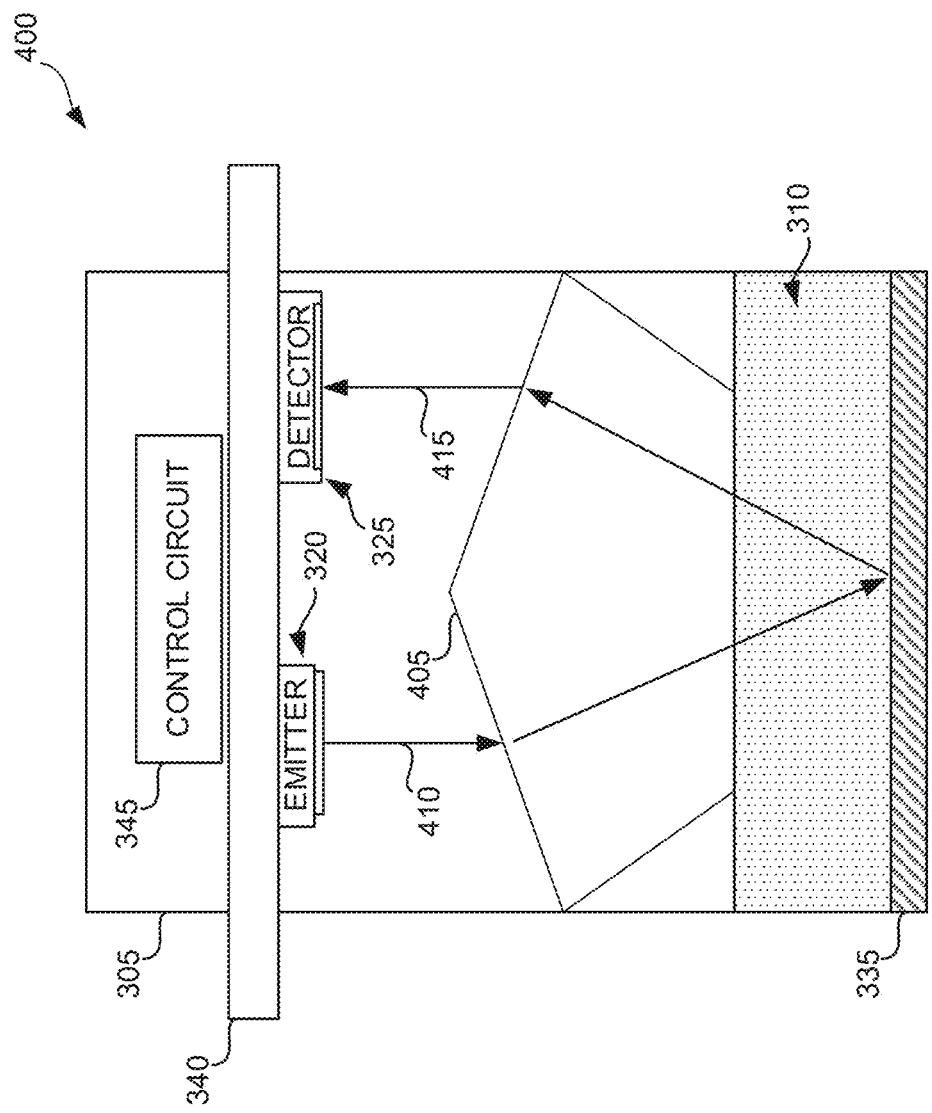
FIG. 4 illustrates an example of an agricultural spectrographic composition sensor that integrates directing elements above and below a flow stream.

FIG. 4 illustrates an example of a composition sensor 400 that integrates directing elements above and below a flow stream. The composition sensor 400 is an example of any of the composition sensors discussed in FIGS. 1-3. In an example, the composition sensor 400 is a version of the composition sensor 300, where the directing element 330 is replaced by the directing element 405. The directing element 405 includes a prism made of a suitable material, such as quarts or sapphire. In an example, the prism operates in the composition sensor 400 to focus an incident light beam 410 into the flow passage. In another example, the prism operates in the composition sensor 400 to spread a returning beam 415 over a surface of the detector element 325. Other elements of the composition sensor 400 are substantially similar to corresponding elements of the composition sensor 300.

Figure 5:
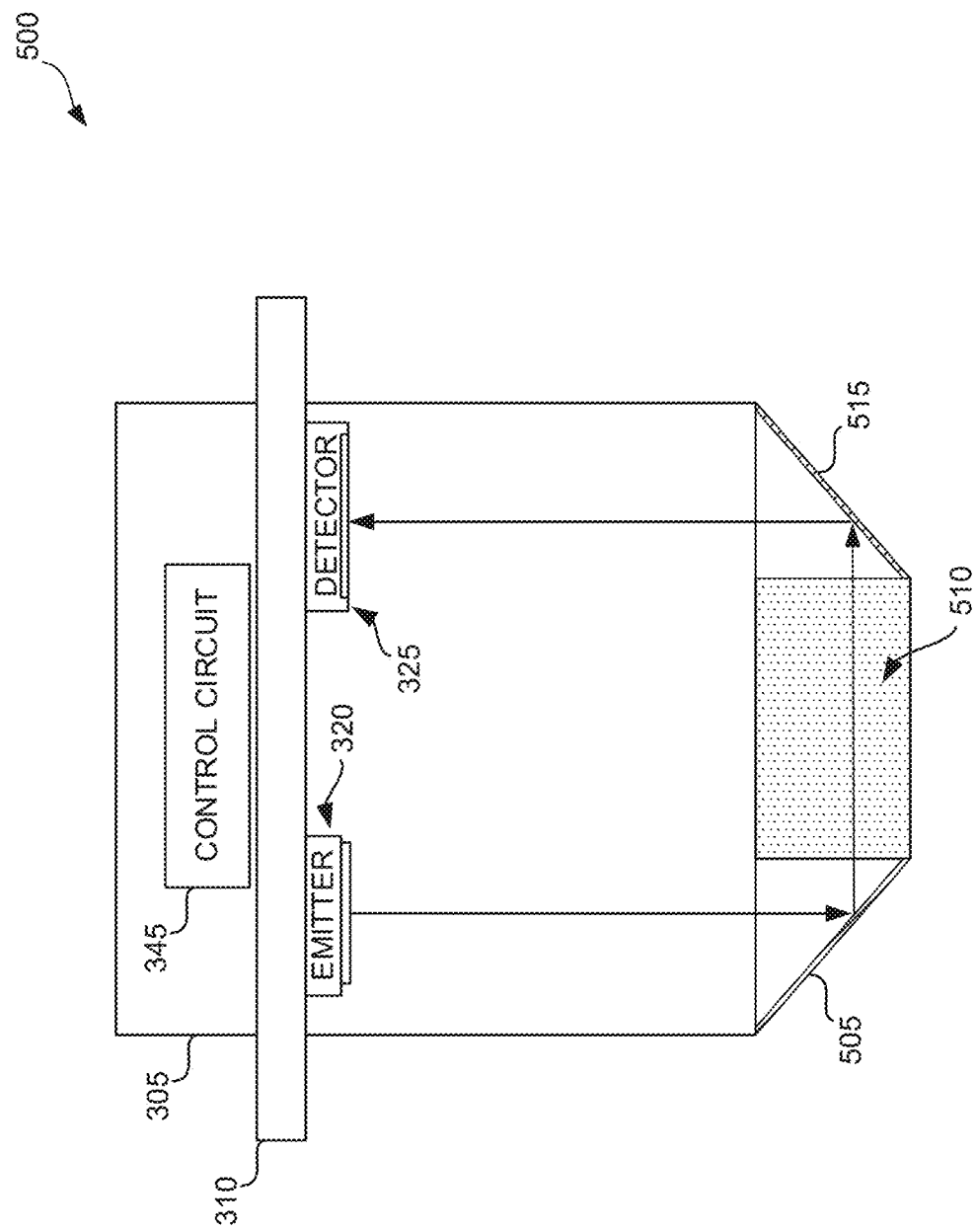
FIG. 5 illustrates an example of an agricultural spectrographic composition sensor that integrates lateral directing elements.

FIG. 5 illustrates an example of a composition sensor 500 that integrates lateral directing elements. The composition sensor 500 is an example of any of the composition sensors discussed in FIGS. 1-3. In an example, the composition sensor 400 is a version of the composition sensor 300, where the sensor housing is optionally modified as indicated, and where the directing element 330 and 335 are replaced by the directing elements 505 and 515. In an example the directing elements 505 and 515 include a mirror that is configured to reflect substantially all incident light at the indicated angle (e.g., a right angle). The flow passage 510 is substantially similar to the flow passage 310, with the exception that the flow agricultural product through the flow passage 510 is directed into, or out of, the page of FIG. 5 while the flow of the agricultural product through the flow passage 310 is directed laterally across the page of FIG. 3. Other elements of the composition sensor 500 are substantially similar to corresponding elements of the composition sensor 300.

Figure 6:
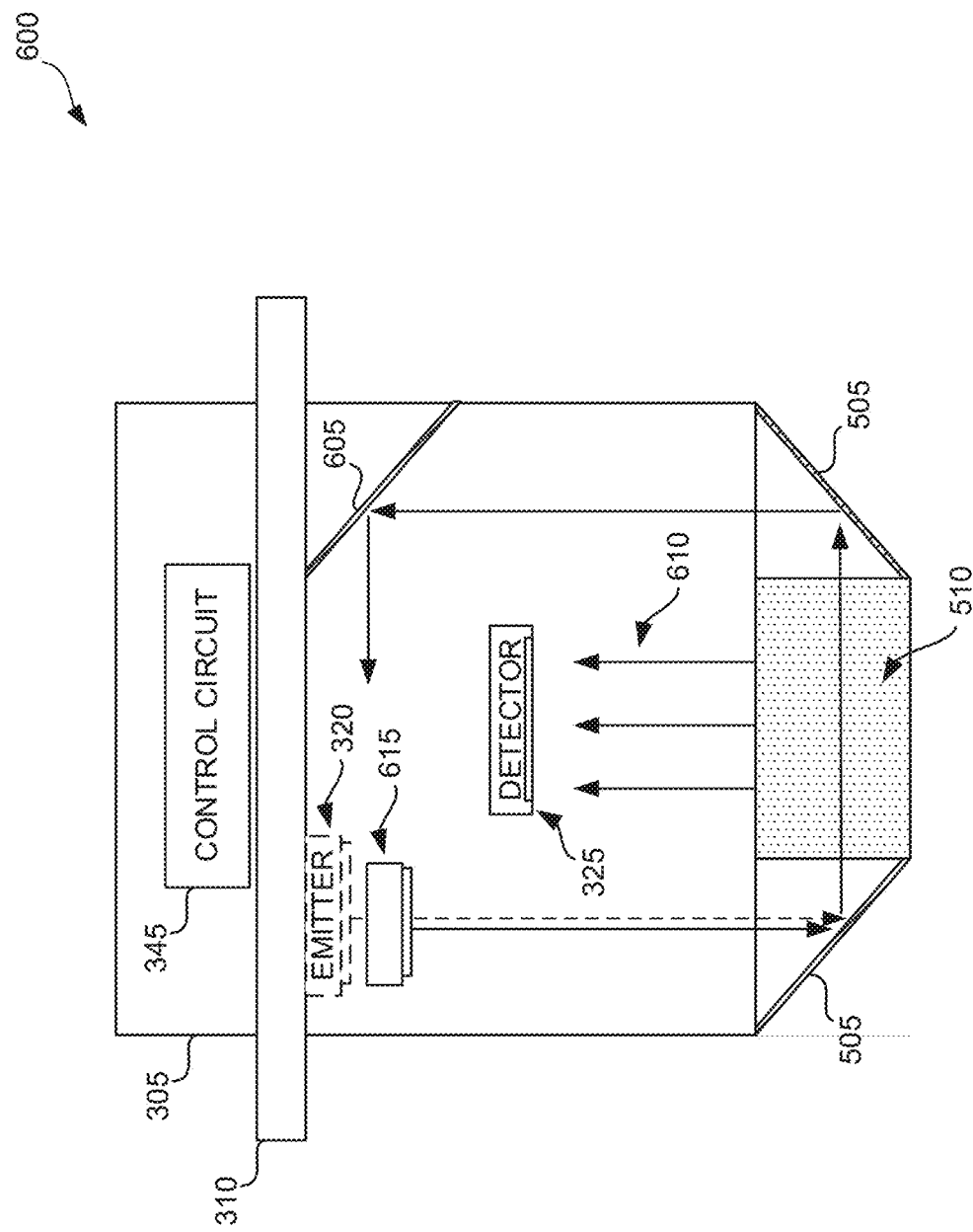
FIG. 6 illustrates an example of an agricultural spectrographic composition sensor that integrates Raman Spectroscopy.

FIG. 6 illustrates an example of an agricultural spectrographic composition sensor that is configured for Raman Spectroscopy. The composition sensor 500 is a modified example of the composition sensor discussed in FIG. 5. The composition sensor 500, however, includes a second emanator element 615 and an additional directing element 605. In an example, the emanator element 615 is a laser, such as a Raman laser, that is configured to excite or agitate elements or compounds with in an agricultural product that is conducted though the flow passage 510. In an example, the emanator element 615 is a blue of green laser element. The directing element 605 is configured to direct reflected or scattered light returning from the flow channel 510 to the emanator element 615. The detector element 325 is disposed at a location in the composition sensor 600 that is suitable for detecting light that is emitted at a 90-degree angle relative to the angle at which the light beam generated by the emanator element 615 traverses the agricultural product in the flow passage 510.

An electromagnetic emanator can include two or more emanating elements. For example, in addition to the use of UV light to probe an agricultural product in the flow passage 510, longer wavelength IR light is used. Specifically, energies corresponding to the molecular vibrational fingerprint region between 2000 cm-1 and 500 cm-1 (5000 nm and 20000 nm) can be used. The IR fingerprint region provides a number of absorption peaks for compounds like herbicides that are used to detect (identify and determine concentration) agricultural products including residue of the save, such as carried over products, in a quantitative manner. In other examples a FTIR (Fourier transform infrared) spectrometer is used. Because water has a large absorbance in the mid-IR region an alternative approach is used.

The approach used with the composition sensor 600 is a Raman spectroscopy arrangement including a laser (e.g., emanator element 615) that probes the agricultural product flow. A shift in the light scattered by the agricultural product from the laser is used to determine vibrational interactions between components of the agricultural product. The Raman technique (e.g., Raman spectroscopy) looks at the wavelength shift in the scattered light to measure IR interaction. Raman spectroscopy is readily usable with dilute aqueous samples such as agricultural products including various injection products in sometimes small concentrations relative to the carrier fluid. The composition sensor 600 provides variation on Raman spectroscopy that uses an ultraviolet light element to increase interaction between components of the agricultural product or create a resonance with molecules of interest (e.g., the molecules are 'driven'). The composition sensor 600 including the light emitting element 320 (e.g., the ultraviolet light driving element) increases sensitivity by one or two orders of magnitude relative to other spectroscopic systems. With the composition sensor 600, instead of looking at a loss in the beam of light, the right angle scattered light is collected for analysis. The composition sensors 400 and 500 work with modification in this type of UV driven arrangement. Instead of a linear path, the returned light for analysis is collected at right angles to the linear path (e.g., the directed light beam through the agricultural product fluid).

An example of a composition sensor 600 including a multiple emanators and having a UV driven increase in sensitivity is shown in FIG. 4. In this case the Raman laser light and optional UV light follow a circuit in the cell and the quantitative light is detected at a right angle to the light path (e.g., the light beam). To obtain a sufficient signal the light source is more intense than in a UV based system because there is less scattered light to collect than in a classic spectrometer (where light loss through absorption is the quantity of interest). Phenyl rings have a large spectral signature in Raman analysis making the UV driven composition sensor a highly sensitive instrument for injection products including phenyl rings.

Additionally, because multiple spectral shifts corresponding to the IR fingerprints for injection products are quantitated, this method is selective. In this probe a solid-state LED laser in the visible to near infrared spectrum is used. The resonance UV LED is a short wavelength emanator, preferably below 280 or 260 nm. As in the composition sensors shown in FIG. 1, the direction elements such as prisms and mirrors are quartz, sapphire or glass and the probe has similar dimensions of 18 to 24 mm in cross section.

Figure 7:
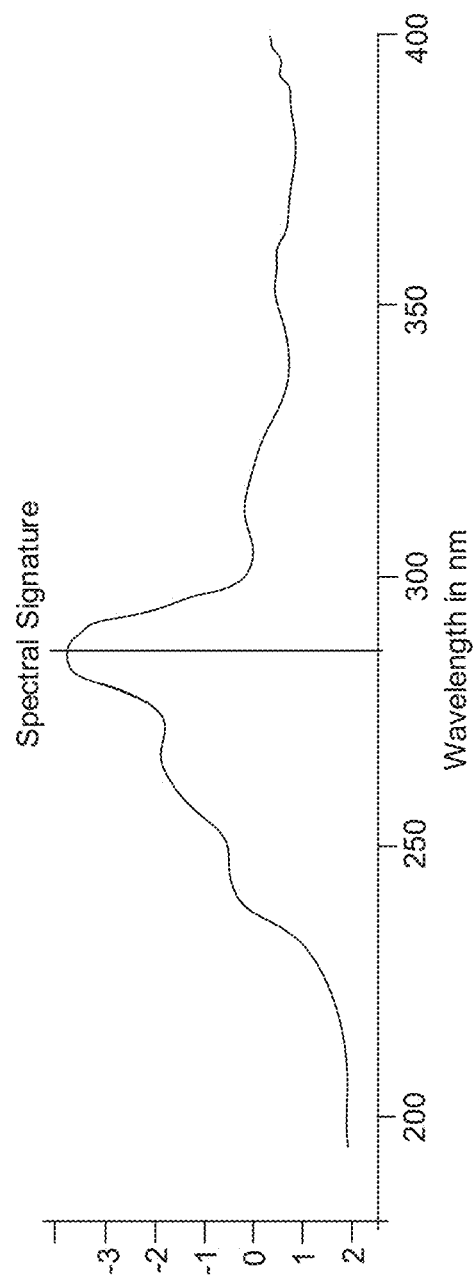
FIG. 7 illustrates diagram of spectral signature obtained from data generated by an example of an agricultural spectrographic composition sensor.

FIG. 7 illustrates a diagram of a spectral signature obtained from data generated by an example of a composition sensor, such as the composition sensor 300, 400, 500, or 600. An example system that integrates the composition sensor was constructed using a spectrometer configured for 200 to 400 nm spectral response, and a deuterium and halogen based compact light source, appropriate quartz cuvettes, and UV-C rated fiber optic cables. A 10 mm path length was used for the test system. The system was optimized to obtain a good signal to noise ratio. Data was collected and compiled into a dataset. This data set was analyzed using chemometric methods for dimensional reduction (PCA/PCR) to build the convolution pattern for analysis. The resulting pattern data was used to evaluate the performance of the test system using carefully prepared samples of a known agricultural product (e.g., an herbicide). The agricultural product concentrations ranging from 0 to 2344 PPM were used in this evaluation. One convolution pattern for agricultural product derived from the chemometric analysis is shown in FIG. 2 below.

Convolution of this spectral signature and the spectra from the herbicide samples was used to determine the loading of deuterium and halogen. The variation of the loading as a function of concentration was used to determine the typical analytical fitness estimates such as the limit of detection (LOD), limits of quantification (LOQ), and linearity. The results are shown in FIG. 8.

Figure 8:
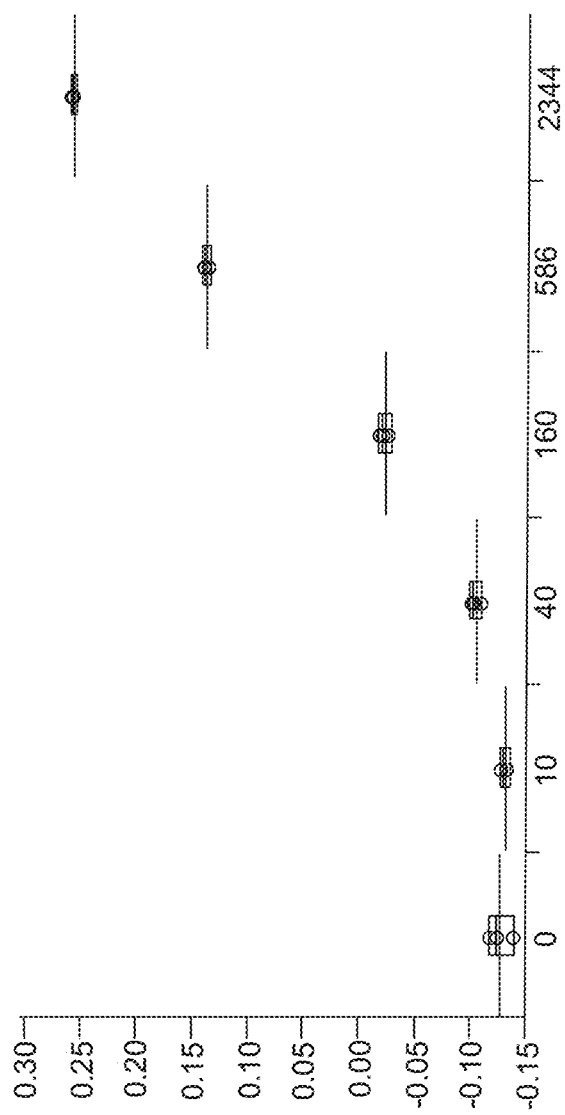
FIG. 8 illustrates diagram of loading as a function of concentration.

FIG. 8 illustrates diagram of loading as a function of concentration. More specifically, FIG. 8 shows the loading as a function of concentration (PPMs) of the herbicide used in the example system described in the discussion of FIG. 7. A one-way analysis of variance (ANOVA) indicates a limit of quantification of approximately 20 ppm. The linear range is from 0 to 160 PPM in the test system. The non-linearity above 160 PPM allows for the development of a transfer equation allowing concentration tracking in the useful application range.

Figure 9:
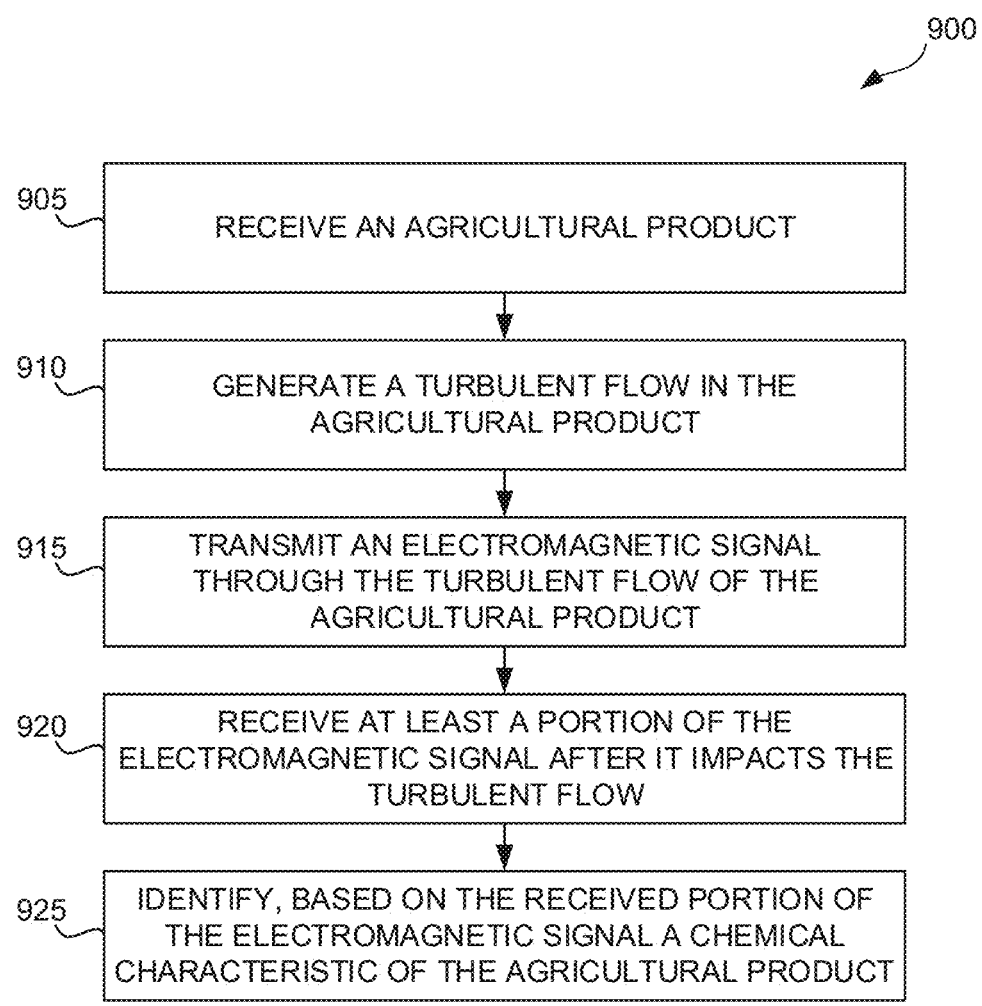
FIG. 9 illustrates a process for an agricultural spectrographic composition sensor.

FIG. 9 illustrates a process 900 that can be executed to measure the concentration or other chemical composition of an agricultural product. At 905, an agricultural product is received, such as in a flow channel of a composition sensor, such as any of the composition sensors described in FIGS. 1-6. At 910 turbulent flow is generated in the received agricultural product, such as by using a turbulator, such as the turbulator 315. At 915 an electromagnetic signal is transmitted through the turbulent flow of the agricultural product, such as by the one or more emanator element, such as the emanator element 320 or 615. At 920, at least a portion of the electromagnetic signal is received after the signal impacts, or traverses, the turbulent flow. The received signal is then processed to obtain a spectrograph of the agricultural product. At 925, a chemical characteristic of the agricultural product is identified based on the received signal or the spectrograph. In an example the chemical characteristic includes a composition or concentration of one or more components of the agricultural product.

Figure 10:
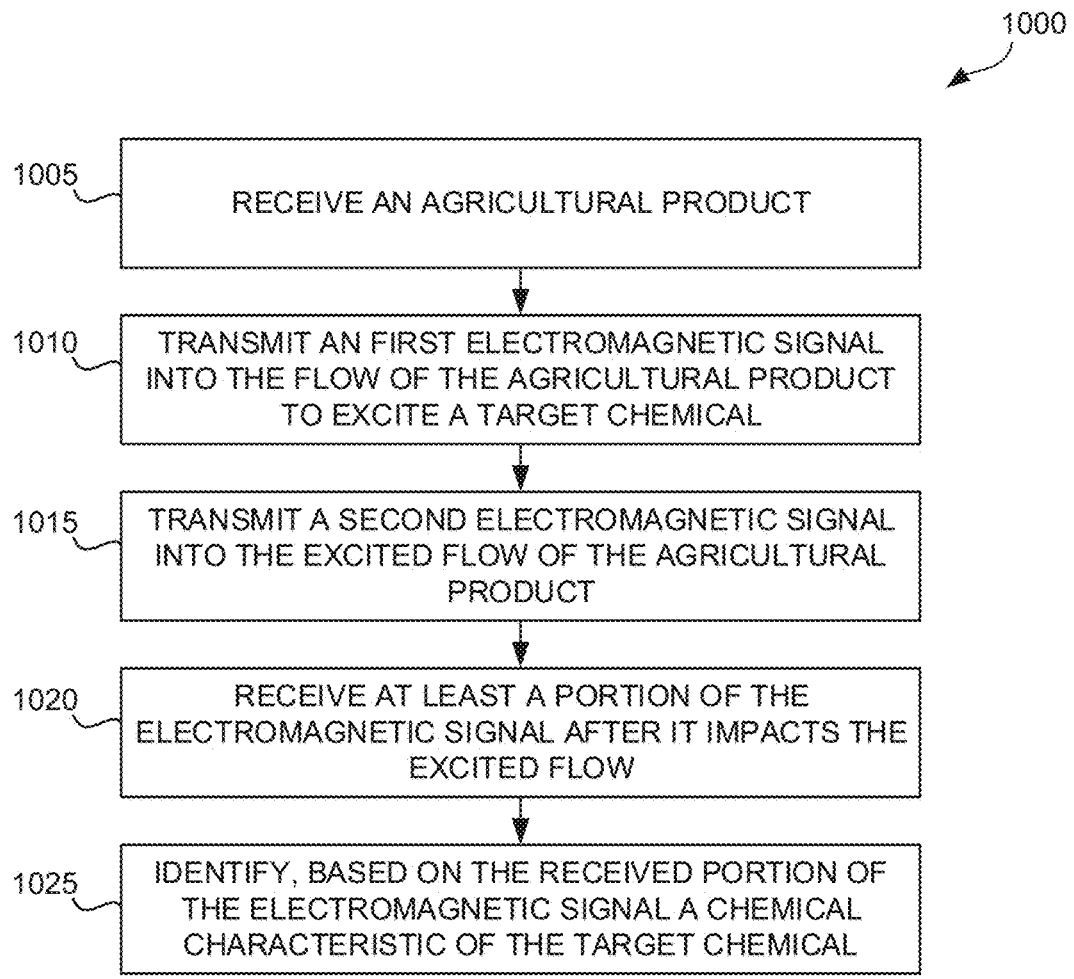
FIG. 10 illustrates a process for an agricultural spectrographic composition sensor.

FIG. 10 illustrates a process 100 that can be executed to measure the concentration or other chemical composition of an agricultural product. At 1005, an agricultural product is received, such as in a flow channel of a composition sensor, such as any of the composition sensors described in FIGS. 1-6. At 1010 an electromagnetic signal is transmitted through the turbulent flow of the agricultural product, such as by the one or more emanator element, such as the emanator element 615. The electromagnetic signal is selected and transmitted to excite a target chemical or the agricultural product. At 1015 a second electromagnetic signal is transmitted through the turbulent flow of the agricultural product, such as by emanator element 320. At 1020, at least a portion of the electromagnetic signal is received after the signal impacts, or traverses, the turbulent flow. In an example the electromagnetic signal is received at a right angle to an incident electromagnetic signal though the agricultural product. The received signal is then processed to obtain a spectrograph of the agricultural product. At 1025, a chemical characteristic of the agricultural product is identified based on the received signal or the spectrograph. In an example the chemical characteristic includes a composition or concentration of one or more components of the agricultural product.

The process 900 or 1000 can include any other steps or operations for implementing the techniques described herein. While the operations of the process 900 or 1000 are shown as happening sequentially in a specific order, in other examples, one or more of the operations may be performed in parallel or in a different order. Additionally, one or more operations may be repeated two or more times.

Figure 11:
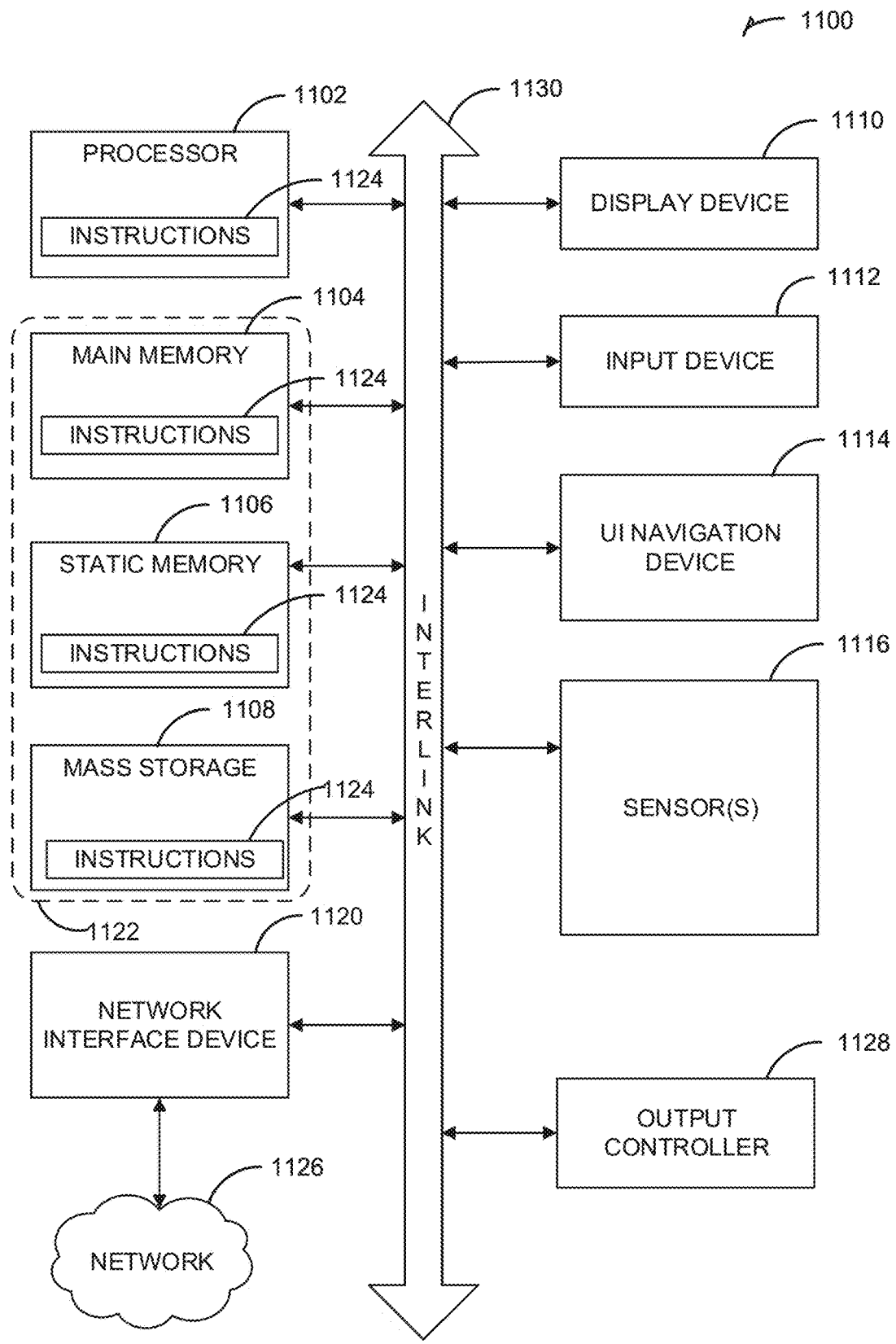
FIG. 11 illustrates a block diagram of an example machine upon which any one or more of the techniques (e.g., methodologies) discussed herein can perform.

FIG. 11 illustrates a block diagram of an example machine 1100 upon which any one or more of the techniques (e.g., methodologies) discussed herein can perform. Examples, as described herein, can include, or can operate by, logic or a number of components, or mechanisms in the machine 1100. Circuitry (e.g., processing circuitry) is a collection of circuits implemented in tangible entities of the machine 1100 that include hardware (e.g., simple circuits, gates, logic, etc.). Circuitry membership can be flexible over time. Circuitries include members that can, alone or in combination, perform specified operations when operating. In an example, hardware of the circuitry can be immutably designed to carry out a specific operation (e.g., hardwired). In an example, the hardware of the circuitry can include variably connected physical components (e.g., execution units, transistors, simple circuits, etc.) including a machine readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine-readable medium elements are part of the circuitry or are communicatively coupled to the other components of the circuitry when the device is operating. In an example, any of the physical components can be used in more than one member of more than one circuitry. For example, under operation, execution units can be used in a first circuit of a first circuitry at one point in time and reused by a second circuit in the first circuitry, or by a third circuit in a second circuitry at a different time. Additional examples of these components with respect to the machine 1100 follow.

In alternative embodiments, the machine 1100 can operate as a standalone device or can be connected (e.g., networked) to other machines. In a networked deployment, the machine 1100 can operate in the capacity of a server machine, a client machine, or both in server-client network environments. In an example, the machine 1100 can act as a peer machine in peer-to-peer (P2P) (or other distributed) network environment. The machine 1100 can be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein (e.g., authenticating transmissions from machines in a job group, generating coverage maps and reports, relaying coverage data, capturing and conditioning sensor information, such as generated by the sensors 155 or 175, and generating guidance information to avoid double coverage of field being processed), such as cloud computing, software as a service (SaaS), other computer cluster configurations.

The machine (e.g., computer system) 1100 can include a hardware processor 1102 (e.g., a central processing unit (CPU), a graphics processing unit (GPU), a hardware processor core, or any combination thereof), a main memory 1104, a static memory (e.g., memory or storage for firmware, microcode, a basic-input-output (BIOS), unified extensible firmware interface (UEFI), etc.) 1106, and mass storage 1108 (e.g., hard drive, tape drive, flash storage, or other block devices) some or all of which can communicate with each other via an interlink (e.g., bus) 1130. The machine 1100 can further include a display unit 1110, an alphanumeric input device 1112 (e.g., a keyboard), and a user interface (UI) navigation device found 1114 (e.g., a mouse). In an example, the display unit 1110, input device 1112 and UI navigation device 1114 can be a touch screen display. The machine 1100 can additionally include a storage device (e.g., drive unit) 1108, a network interface device 1120, and one or more sensors found 1116, such as a global positioning system (GPS) sensor, compass, accelerometer, or other sensor. The machine 1100 can include an output controller 1128, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

Registers of the processor 1102, the main memory 1104, the static memory 1106, or the mass storage 1108 can be, or include, a machine readable medium 1122 on which is stored one or more sets of data structures or instructions 1124 (e.g., software) embodying or utilized by any one or more of the techniques or functions described herein. The instructions 1124 can also reside, completely or at least partially, within any of registers of the processor 1102, the main memory 1104, the static memory 1106, or the mass storage 1108 during execution thereof by the machine 1100. In an example, one or any combination of the hardware processor 1102, the main memory 1104, the static memory 1106, or the mass storage 1108 can constitute the machine readable media 1122. While the machine readable medium 1122 is illustrated as a single medium, the term "machine readable medium" can include a single medium or multiple media (e.g., a centralized or distributed database, and/or associated caches and servers) configured to store the one or more instructions 1124.

The term "machine readable medium" can include any medium that is capable of storing, encoding, or carrying instructions for execution by the machine 1100 and that cause the machine 1100 to perform any one or more of the techniques of the present disclosure, or that is capable of storing, encoding or carrying data structures used by or associated with such instructions. Non-limiting machine-readable medium examples can include solid-state memories, optical media, magnetic media, and signals (e.g., radio frequency signals, other photon-based signals, sound signals, etc.). In an example, a non-transitory machine-readable medium comprises a machine-readable medium with a plurality of particles having invariant (e.g., rest) mass, and thus are compositions of matter. Accordingly, non-transitory machine-readable media are machine readable media that do not include transitory propagating signals. Specific examples of non-transitory machine-readable media can include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 1124 can be further transmitted or received over a communications network 1126 using a transmission medium via the network interface device 1120 utilizing any one of a number of transfer protocols (e.g., frame relay, internet protocol (IP), transmission control protocol (TCP), user datagram protocol (UDP), hypertext transfer protocol (HTTP), etc.). Example communication networks can include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMAX®), IEEE 802.15.4 family of standards, peer-to-peer (P2P) networks, among others. In an example, the network interface device 1120 can include one or more physical jacks (e.g., Ethernet, coaxial, or phone jacks) or one or more antennas to connect to the communications network 1126. In an example, the network interface device 1120 can include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 1100, and includes digital or analog communications signals or other intangible medium to facilitate communication of such software. A transmission medium is a machine readable medium.

The above description includes references to the accompanying drawings, which form a part of the detailed description. The drawings show, by way of illustration, specific embodiments in which the invention can be practiced. These embodiments are also referred to herein as "aspects" or "examples." Such aspects or example can include elements in addition to those shown or described. However, the present inventors also contemplate aspects or examples in which only those elements shown or described are provided. Moreover, the present inventors also contemplate aspects or examples using any combination or permutation of those elements shown or described (or one or more features thereof), either with respect a particular aspects or examples (or one or more features thereof), or with respect to other Aspects (or one or more features thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Geometric terms, such as "parallel", "perpendicular", "round", or "square", are not intended to require absolute mathematical precision, unless the context indicates otherwise. Instead, such geometric terms allow for variations due to manufacturing or equivalent functions. For example, if an element is described as "round" or "generally round," a component that is not precisely circular (e.g., one that is slightly oblong or is a many-sided polygon) is still encompassed by this description.

Method aspects or examples described herein can be machine or computer-implemented at least in part. Some aspects or examples can include a computer-readable medium or machine-readable medium encoded with instructions operable to configure an electronic device to perform methods as described in the above aspects or examples. An implementation of such methods can include code, such as microcode, assembly language code, a higher-level language code, or the like. Such code can include computer readable instructions for performing various methods. The code may form portions of computer program products. Further, in an aspect or example, the code can be tangibly stored on one or more volatile, non-transitory, or non-volatile tangible computer-readable media, such as during execution or at other times. Aspects or examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described aspects or examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should riot be interpreted as intending that an unclaimed disclosed feature is essential to any claim. Rather, inventive subject matter may lie in less than all features of a particular disclosed embodiment. Thus, the following claims are hereby incorporated into the Detailed Description as aspects, examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

VARIOUS NOTES & EXAMPLES

Example 1 is an agricultural composition sensor comprising: a sensor housing including a flow passage configured to conduct an agricultural product; a turbulating element in the flow passage, the turbulating element configured to initiate turbulent flow in the agricultural product; and a sensor assembly coupled with the sensor housing, the sensor assembly configured to detect one or more injection products in the agricultural product, the sensor assembly includes: an emanator configured to generate at least one light beam; a sensing element configured to receive the at least one light beam; a directing element configured to deliver the light beam through the turbulent flow of the agricultural product; and wherein the sensing element is configured to generate a spectral plot of the turbulent flow of the agricultural product having one or more spectral signatures corresponding to the one or more injection products.

In Example 2, the subject matter of Example undefined includes, wherein the emanator includes: a first light element configured to generate a first light beam; a second light element configured to generate a driving light beam, the driving light beam excites the one or more injection products; and wherein the sensing element is configured to generate a spectral plot of the agricultural product having one or more enhanced spectral signatures corresponding to the one or more excited injection products.

In Example 3, the subject matter of Example undefined includes, wherein the turbulating element is upstream from the sensing element.

In Example 4, the subject matter of Example undefined includes, wherein the turbulating element includes one or more of posts, fins, elbows or knurling in the flow passage.

Example 5 is an agricultural composition sensor comprising: a sensor housing including a flow passage configured to conduct an agricultural product; a sensor assembly coupled with the sensor housing, the sensor assembly configured to detect one or more injection products in the agricultural product, the sensor assembly includes: a first emanator configured to generate a first light beam; a second emanator configured to generate a driving light beam, the driving light beam excites the one or more injection products; a sensing element configured to receive the first light beam passing through the flow of the agricultural product; wherein the sensing element is configured to generate an enhanced spectral plot from the first light beam having one or more enhanced spectral signatures corresponding to the one or more injection products.

In Example 6, the subject matter of Example 5 includes, wherein the sensing element is configured to receive scattered light at an angle relative to the first light beam passing through the flow.

In Example 7, the subject matter of Examples 5-6 includes, wherein the first emanator is a laser emanator, and the second emanator is an ultraviolet light emanator.

Example 8 is a method comprising: receiving an agricultural product in a flow passage of a sensor; initiating turbulent flow in the agricultural product; generating at least one light beam; transmitting the at least one light beam through the turbulent flow of the agricultural product; and generating a spectral plot of the turbulent flow of the agricultural product having one or more spectral signatures corresponding to the one or more injection products.

In Example 9, the subject matter of Example 8 includes, generating a driving light beam to the one or more injection products; and generating a spectral plot of the agricultural product having one or more enhanced spectral signatures corresponding to the one or more excited injection products.

Example 10 is at least one machine-readable medium including instructions that, when executed by processing circuitry, cause the processing circuitry to perform operations to implement of any of Examples 1-9.

Example 11 is an apparatus comprising means to implement of any of Examples 1-9.

Example 12 is a system to implement of any of Examples 1-9.

Example 13 is a method to implement of any of Examples 1-9.

The claimed invention is:

1. An agricultural composition sensor comprising:
a sensor housing including a flow passage configured to conduct an agricultural product;
a turbulating element in the flow passage, the turbulating element configured to initiate turbulent flow in the agricultural product; and
a sensor assembly coupled with the sensor housing, the sensor assembly configured to detect one or more injection products in the agricultural product, the sensor assembly includes:
a first emanator configured to generate a first light beam having a first wavelength, the first light beam configured to measure interactions of the one or more injection products based on scattered light generated responsive to the first light beam;
a second emanator configured to generate a second light beam having a second wavelength configured to increase the scattered light generated responsive to the first light beam by increasing the interactions of the one or more injection products measured by the first light;
a sensing element configured to receive, from the excited agricultural product, the scattered light;
a directing element configured to deliver the at least one of the first light beam or the second light beam to the turbulent flow of the agricultural product.

2. The agricultural composition sensor of claim 1, wherein the sensing element is configured to generate spectral data that is indicative of the excited agricultural product, the spectral data comprising one or more spectral signatures corresponding to the one or more injection products.

3. The agricultural composition sensor of claim 1, wherein the turbulating element is upstream from the sensing element.

4. The agricultural composition sensor of claim 1, wherein the sensing element is configured to receive the scattered light after the scattered light is radiated by the excited agricultural product in a direction perpendicular to a direction at which the first light beam is configured to traverse the turbulent flow of the agricultural product.

5. The agricultural composition sensor of claim 1, further comprising delivering at least one of the first light beam or the second light beam to the agricultural product using at least one of a prism, a mirror, or a fiber optic cable.

6. The agricultural composition sensor of claim 1, further comprising delivering at least one of the first light beam or the second light beam to the agricultural product using a material including at least one of quartz, sapphire, or glass.

7. The agricultural composition sensor of claim 1, further comprising generating the first light beam using ultraviolet light source and generating the second light beam using an infrared laser emanator.

8. The agricultural composition sensor of claim 1, wherein the first emanator includes a light source having a wavelength that creates a resonance between specified types of molecules in the agitated agricultural product.

9. An agricultural composition sensor comprising:
a sensor housing including a flow passage configured to conduct an agricultural product;
a sensor assembly coupled with the sensor housing, the sensor assembly configured to detect one or more injection products in the agricultural product, the sensor assembly includes:
a first emanator configured to generate a first light beam having a first wavelength, the first light beam configured to measure interactions between one or more injection products in the agricultural product based on scattered light generated by the one or more injection products responsive to the first light beam;
a second emanator configured to generate a driving light beam having a second wavelength, the second wavelength selected to increase a quantity of the scattered light generated by the one or more injection products responsive to the first light beam by increasing the interactions between the one or more injection products measured by the first light; and
a sensing element configured to receive the scattered light;
wherein the sensing element is configured to generate an enhanced spectral plot from the first light beam having one or more enhanced spectral signatures corresponding to the one or more injection products.

10. The agricultural composition sensor of claim 9, wherein the sensing element is configured to receive the scattered light from a direction that is perpendicular to a direction at which the first light beam traverses the flow.

11. The agricultural composition sensor of claim 9, wherein the first emanator is a laser emanator, and the second emanator is an ultraviolet light emanator.

12. The agricultural composition sensor of claim 9, further comprising a directing element configured to deliver the first light beam or the driving light beam to the turbulent flow of the agricultural product.

13. The agricultural composition sensor of claim 9, wherein the directing element comprises at least one of a prism, a mirror, or a fiber optic cable.

14. The agricultural composition sensor of claim 13, wherein the directing element comprises a material comprising at least one of quartz, sapphire, or glass.

15. The agricultural composition sensor of claim 9, further comprising a turbulating element in the flow passage, the turbulating element configured to initiate turbulent flow in the agricultural product.

16. The agricultural composition sensor of claim 15, wherein the turbulating element includes one or more of posts, fins, elbows or knurling in the flow passage.

17. A method comprising:
receiving an agricultural product in a flow passage of a sensor, the agricultural product having one or more injection products;
initiating turbulent flow in the agricultural product;
agitating the agricultural product in the turbulent flow using a first light beam having a first wavelength, the first wavelength configured to increase vibrational interactions between components of the agricultural product;
probing the agitated agricultural product using a second light beam having a second wavelength to generate scattered light that is indicative of the increased vibrational interactions between the components of the agricultural product;
detecting the scattered light of the second light beam; and
generating a spectral data of the turbulent flow of the agricultural product having one or more spectral signatures corresponding to the one or more injection products.

18. The method of claim 17, further comprising:
generating, based on the scattered light, a spectral plot of the turbulent flow of the agricultural product having one or more spectral signatures based on vibrational interactions of the one or more injection products.

19. The method of claim 17, further comprising:
agitating the agricultural product in the turbulent flow using, as the first light beam, a light beam having a wavelength that creates a resonance between specified types of molecules in the agitated agricultural product.

* * * * *